United States Patent
Kobayashi et al.

[11] Patent Number: 4,466,004
[45] Date of Patent: Aug. 14, 1984

[54] THERMOMAGNETIC RECORDING

[75] Inventors: Hiroshi Kobayashi, Tokyo; Motoharu Tanaka, Numazu; Hajime Machida; Takashi Yano, both of Tokyo; Uee Myong Hwang, Chiba, all of Japan

[73] Assignee: Ricoh Company, Ltd., Japan

[21] Appl. No.: 334,545

[22] Filed: Dec. 28, 1981

[30] Foreign Application Priority Data

Jan. 5, 1981 [JP] Japan ..................................... 56-234

[51] Int. Cl.³ ............................................ G01D 15/12
[52] U.S. Cl. .................................................. 346/74.4
[58] Field of Search .................. 346/76 L, 74.2, 74.4, 346/74.5, 107 R, 108; 358/301; 360/59

[56] References Cited
U.S. PATENT DOCUMENTS
3,626,114 12/1971 Lewicki et al. .................. 360/59 X OTHER PUBLICATIONS
Nomura et al., Thermomagnetic Video Recording, NHK Laboratories Note, Mar. 1978.

Primary Examiner—Thomas H. Tarcza
Attorney, Agent, or Firm—Guy W. Shoup

[57] ABSTRACT

A method and apparatus for recording information on a magnetic recording medium with high density is provided. A heat spot of predetermined area is applied to the recording medium to raise the local temperature of the recording medium where the heat spot is applied above the Curie point of the recording medium. The heat spot is moved along the recording medium and a magnetic field is applied when a part of the recording medium heated by the heat spot is in the neighborhood of the Curie point in its cooling process, thereby recording information on the recording medium. In accordance with the present invention, an element or bit of information to be recorded on the recording medium is formed by a portion of the heat spot; thus, it relaxes recording conditions and allows to increase recording density.

11 Claims, 6 Drawing Figures

THERMOMAGNETIC RECORDING

BACKGROUND OF THE INVENTION

1. Field of the Invention

This invention relates to improvements in the thermomagnetic recording technology and more in particular to a method and apparatus for recording information on a thermomagnetic recording medium with the use of its Curie point or compensation point.

2. Description of the Prior Art

In order to increase recording density in magnetic recording, the size of a bit pattern which constitutes an element in recording information on a recording medium must be made smaller. It is a well established concept that as a representative size $\lambda$ of the bit pattern is made smaller, the gap $\delta$ between a magnetic head and the magnetic recording medium must be made smaller proportionately. This is because, the magnetic force lines from a small magnet extend further in proportion to its size. It has been known that the following approximate relation holds between representative size $\lambda$ of the bit pattern, gap $\delta$ between the magnetic head and the recording medium, and output signal level D (in decibels) when reproduced by the magnetic head.

$$D \simeq -55(\delta/\lambda)$$

As is obvious from the above equation, when the gap $\delta$ between the magnetic head and the magnetic recording medium has a finite value, the level D of the output signal read by the magnetic head decreases by certain decibels determined in accordance with the above equation as compared with the reference output signal level when the gap $\delta$ is zero, i.e., the magnetic head being in contact with the recording medium. For example, suppose that the representative size $\lambda$ such as bit pattern spacing is 1 $\mu$m, then even if the gap $\delta$ between the magnetic head and the recording medium is as small as 0.4 $\mu$m, the decrease in signal level amounts to about 22 decibels, indicating a significant decrease in output signal level. Thus, in order not to decrease the level of output signal to an unacceptable degree, the value of $\delta/\lambda$ must be maintained approximately in the range between 0.2 and 0.4.

FIG. 1 shows the typical arrangement of a prior art vertical magnetic recording system. As shown, a permalloy strip 1 is enclosed by a protective material 2 such as plastics to form a main magnetic pole 3. Opposite to the pole 3 is disposed a counter magnetic pole 5 comprised of a ferrite body having a high permeability and wound around by a coil 4. The main and counter magnetic poles 3 and 5 together form a magnetic head. A vertical magnetic recording medium M is inserted between the main and counter magnetic poles 3 and 5, thereby information may be recorded onto or read out of the medium M. The medium M may be constructed by forming on the surface of a substrate an amorphous magnetic thin film comprised of a family of rare earth-transition metal elements such as Co-Cr, Mn-Bi, Tb-Fe, Gd-Fe, Dy-Fe, etc., by means of vapor deposition, sputtering and the like.

FIG. 2 shows another prior art recording system for carrying out high density magnetic recording similarly with the system of FIG. 1. The system of FIG. 2 is often referred to as an optomagnetic recording system because use is made of a laser beam as means for applying heat to the recording medium M for recording information. As shown, a laser beam carrying therein information to be recorded is emitted from a recording laser device 6 and caused to impinge upon the medium M through a convergent lens 7. The portion of the medium M where the beam impinges upon becomes locally heated, and when the temperature of the heated portion rises above the Curie point of the vertical magnetic recording medium M, its local coercive force sharply decreases. Under the condition, the direction of magnetization of the thus heated portion is reversed due to an external magnetic field applied by a coil 8, thereby recording information on the medium M.

It should however be noted that the prior art recording system of FIG. 1 is disadvantageous because it is extremely difficult to maintain a proper gap between the magnetic head and the vertical magnetic recording medium M. Besides, the magnetic head suffers from wear due to occasional contact with the medium M. The prior art system of FIG. 2 is also disadvantageous since its recording density is rather limited. That is, in this case, the characteristic size of a bit to be recorded cannot be made smaller than the wavelength of the laser beam because of diffraction and other phenomena.

SUMMARY OF THE INVENTION

The disadvantages of the prior art are overcome with the present invention and an improved method and apparatus for carrying out a high density recording is provided. In accordance with one aspect of the present invention, there is provided a method for recording information on a magnetic recording medium by locally specifying the direction of magnetization in said medium which has the property of increasing easiness in specifying the direction of magnetization when heated to or above a predetermined temperature, said method comprising the steps of: applying a heat spot of predetermined area to said recording medium, the temperature of that portion of the recording medium where said heat spot is applied being equal to or greater than said predetermined temperature; moving said heat spot along the surface of said recording medium; and applying a magnetic field while a part of the heat spot at a certain point along its travelling path is in the neighborhood of said predetermined temperature in its cooling process, whereby information is recorded on said recording medium by orientating and holding the direction of magnetization of said part of the heat spot as determined by the direction of said applied magnetic field.

Preferably, the heat spot is applied by a laser beam. The predetermined temperature is preferably the Curie point of the material which forms the recording medium. Thus, the recording medium forming material has the property such that its coercive force sharply decreases when heated to the neighborhood of its Curie point.

The recording medium to be used in the present invention preferably includes a thin film of MnBi. Alternatively, the recording medium includes an amorphous thin film comprised of a combination selected from a first group of heavy rare earth elements and a second group of transition metals. Such a combination may be preferably selected from the group consisting of Tb-Fe, Gd-Fe, Dy-Fe, Gd-Co, and Ho-Co.

In accordance with another aspect of the present invention, there is provided a method for recording information on a magnetic recording medium by locally specifying the direction of magnetization in said medium which has the property of increasing easiness in specifying the direction of magnetization when heated to or above a predetermined temperature, the method comprising the steps of: applying a heat spot of predetermined area to said recording medium, the temperature of that portion of said recording medium where said heat spot is applied being equal to or greater than said predetermined temperature; moving said heat spot along the surface of said recording medium; and applying a magnetic field while said heat spot is moving from a first location to a second location, the first heat spot at said first location and the second heat spot at said second location having an overlapping portion, whereby information is recorded on said recording medium by orientating the direction of magnetization of that portion of said first heat spot excepting said overlapping portion in accordance with the direction of said applied magnetic field.

Preferably, the orientated direction of magnetization is fixed as that portion of the first heat spot, where the direction of magnetization is orientated in a specified direction by the application of a magnetic field, cools down. Such cooling is preferably carried out by natural cooling. Furthermore, it is preferable that the recording medium to be used in the present invention is locally magnetized for recording information in one direction vertical to the recording surface of said recording meium or its opposite direction.

In accordance with a further aspect of the present invention, there is provided an apparatus for recording information on a magnetic recording medium by locally specifying the direction of magnetization in said medium which has the property of increasing easiness in specifying the direction of magnetization when heated to or above a predetermined temperature, said apparatus comprising means for applying a heat spot on the recording surface of said recording medium; means for causing to move said heat spot along the recording surface of said recording medium; and means for applying a magnetic field to said recording medium at least partly, said magnetic field application means applying a magnetic field to record information on said recording medium in the form of a partial section of said heat spot where the direction of magnetization is orientated in a specified direction by said applied magnetic field.

It is therefore an object of the present invention to provide an improved magnetic recording method and apparatus.

Another object of the present invention is to provide a method and apparatus capable of carrying out high density recording.

A further object of the present invention is to provide a high density thermomagnetic recording method and apparatus which allows to record a bit of information on a recording medium by a partial section of a heat spot applied to the medium, thus increasing the effective use of a recording medium.

A still further object of the present invention is to provide a high density thermomagnetic recording method and apparatus which is simple in structure and easy in implementation.

Other objects, advantages and novel features of the present invention will become apparent from the following detailed description of the invention when considered in conjunction with the accompanying drawings.

DESCRIPTION OF THE PREFERRED EMBODIMENTS

Figure 1:
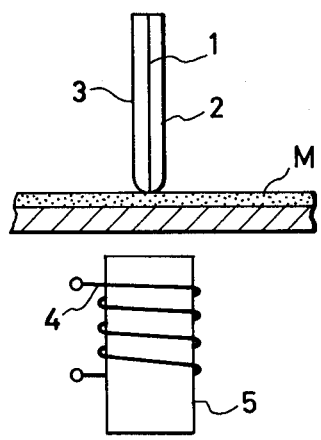
FIG. 1 is a schematic illustration showing the arrangement of a prior art vertical magnetic recording system.
Figure 2:
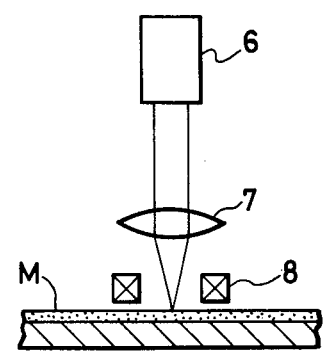
FIG. 2 is a schematic illustration showing the arrangement of a prior art vertical thermomagnetic recording system.
Figure 3:
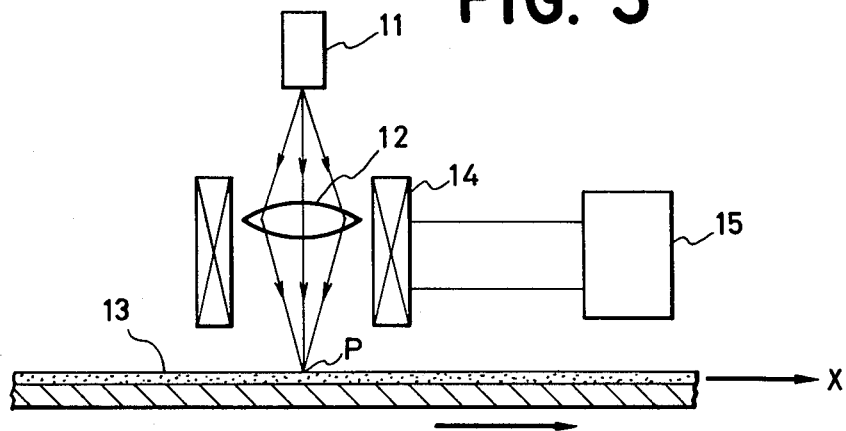
FIG. 3 is a schematic illustration showing the arrangement of the magnetic recording apparatus in accordance with one embodiment of the present invention.

Referring now to FIG. 3, there is shown a vertical thermonagnetic recording system in accordance with one embodiment of the present invention. The system includes a semiconductor laser device 11 as a source for supplying a heat spot. Use may be made of other heat spot supplying sources; however, such a source may preferably supply a heat spot continuously. The system also includes a lens system 12 for directing the laser beam emitted from the laser device 11 to the surface of a vertical magnetic recording medium 13, which is vertical-magnetization anisotropic. That is, the recording medium 13 may be magnetized only in the direction vertical to its surface. The recording medium 13 may be moved in the direction indicated by the arrow at a high speed. The present system further includes a coil 14 disposed at a position such that the magnetic field produced by the coil 14 may be applied to a desired position of the recording medium 13. Connected to the coil 14 is a signal source 15 which supplies a current carrying information to be recorded to the coil 14.

With the arrangement shown in FIG. 3, a laser beam is emitted from the laser device 11 and the laser beam is passed through the lens system 12 to impinge upon the recording (top) surface of the recording medium 13 at point P. Thus, as will be described later in detail, a heat spot having a predetermined area is formed on the recording surface. Thus, as the recording medium 13 is moved in the direction indicated by the arrow, the heat spot travels along the recording surface in the direction opposite to the indicated arrow.

The recording medium 13 to be used in the present invention is comprised of a material having a Curie point. Thus, the magnetic property of the recording medium 13 varies markedly across a Curie point. In other words, the coercive force decreases significantly when the medium is heated to or above the Curie point. In the present application, it is preferable that the recording medium 13 has a relatively low Curie point, for example approximately 70° C. at the lowest. The recording medium preferably comprises a thin film of MnBi or an amorphous thin film comprised of a combination of heavy rare earth elements and transition metals. Such a combination may be preferably selected from the group consisting of Tb-Fe, Gd-Fe, Dy-Fe, Gd-Co, and Ho-Co. With these materials, the coercive force sharply decreases when a point somewhat below the Curie point is reached as it is heated.

Figure 4:
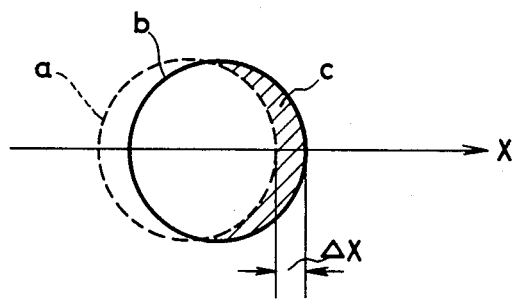
FIG. 4 is a schematic illustration showing, on an enlarged scale, the displacement of the heat spot along the surface of the recording medium at location P indicated in FIG. 3.

FIG. 4 schematically illustrates a circular heat spot at point P in FIG. 3. Since the recording medium 13 is moved to the right with respect to the heat spot, when looked from the frame of reference of the recording medium 13, the heat spot moves to the left. Thus, the heat spot b at a first position indicated by the solid line moves to the heat spot a at a second position indicated by the dotted line after elapsing time Δt.

In operation, as described above, the heat spot moves along the recording surface from the first point b to the second point a, as shown in FIG. 4, during a period of time Δt. In the preferred embodiment, the heat spot is continuously applied to the recording surface such that the area within the heat spot is above the Curie point of the recording medium 13. Thus, when the heat spot moves to the second position a, the shaded area c of the heat spot at the first position (solid line in FIG. 4) does not receive a laser beam and therefore its temperature drops rapidly and it goes below the Curie point eventually to the room temperature.

Under the condition, a signal current indicative of the information to be recorded is supplied from the signal source 15 to the coil 14. Thus, the coil 14 produces a magnetic field which is applied to the recording medium 13 such that the magnetic field is applied at least to the shaded area c. Since the temperature of the shaded area c drops from a heated high value to the room temperature through the Curie point, the coercive force in that section becomes extremely small in the neighborhood of the Curie point. By applying a magnetic field to the shaded area c while the coercive force in that section is small, the shaded area c becomes magnetized in a specified direction as determined by the direction of the field, thereby recording information on the recording medium 13.

The coercive force in the shaded area c rapidly increases as the temperature of that section further drops toward the room temperature. Thus, the specified direction of magnetization in the area c becomes fixed and it remains unchanged even if a magnetic field is again applied in subsequent recording steps. As appreciated, in accordance with the present embodiment, the shaded area c in the form of a crescent constitutes an element or bit of information to be recorded on the recording medium 13. And it should be noted that such a bit of information is smaller than the heat spot areawise and the required bit area may be selected as small as practically possible.

Figure 5:
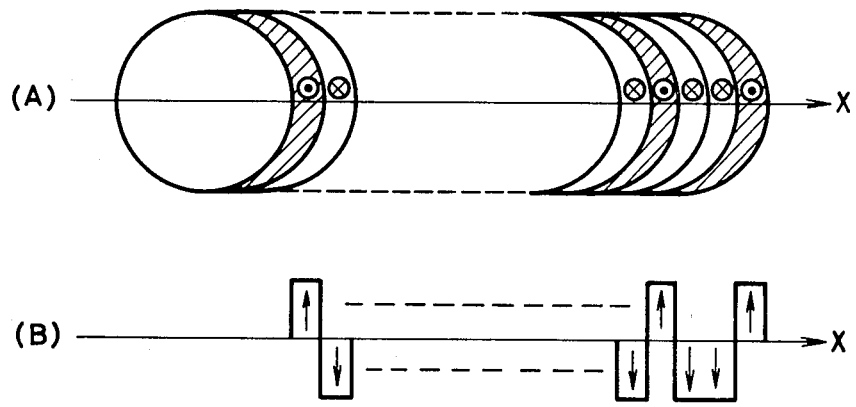
FIGS. 5(A) and (B) schematically illustrate how bits of information are recorded in accordance with the present invention.

One example of a chain of information bits recorded in accordance with the above-described embodiment of the present invention is illustrated in FIGS. 5(A) and 5(B). As shown, all of the information bits are in the form of a crescent, but there are two different types of bits, that is those pointing upward and those pointing downward with respect to the surface of the drawings or the recording medium 13. Thus, in this embodiment, binary data may be recorded.

As understood, in accordance with the present invention, a recording medium having a Curie point is locally heated above the Curie point in the form of a heat spot, and a magnetic field is applied while a part of the heat spot is in the neighborhood of the Curie point in its cooling process to magnetize that part in a desired direction, thereby recording information on the recording medium. The present invention allows to make the recording element or bit extremely small, and therefore the recording density is increased significantly as compared with the prior art techniques.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims. For example, use may be made of any conventional means for applying a required heat spot other than a laser device as described above. Similarly, any conventional device known to those skilled in the art may be used as means for applying a magnetic field. What is claimed is:

1. A method for recording information on a magnetic recording medium by locally specifying the direction of magnetization as a bit of information in said medium while cooling down after having been heated to or above its Curie point, said method comprising the steps of:

(a) applying a heat spot of predetermined area to said recording medium, the temperature of that portion of the recording medium when said heat spot is applied being equal to or greater than said Curie point;

(b) moving said heat spot along the surface of said recording medium; and (c) applying a magnetic field while a part of the heat spot at a certain point along its travelling path is in the neighborhood of said Curie point in its cooling process, whereby information is recorded on said recording medium with said part of the heat spot as a bit of information by orienting and holding the direction of magnetization of said part of the heat spot as determined by the direction of said applied magnetic field.

2. The method as defined in claim 1 wherein said heat spot is applied by a laser beam.

3. The method as defined in claim 1 wherein said recording medium includes a material which has the property such that its coercive force sharply decreases when heated to the neighborhood of its Curie point.

4. The method as defined in claim 1 wherein said recording medium includes a thin film of MnBi.

5. The method as defined in claim 1 wherein said recording medium includes an amorphous thin film comprised of a combination of materials, one of which is selected from the first group consisting of heavy rare earth elements and another of which is selected from the second group consisting of transition metals.

6. The method as defined in claim 5 wherein said combination of materials is selected from the group consisting of Tb-Fe, Gd-Fe, Dy-Fe, Gd-Co, and Ho-Co.

7. A method for recording information on a magnetic recording medium in a bit form by locally specifying the direction of magnetization in said medium while cooling down after having been heated to or above its Curie point, said method comprising the steps of:

(a) applying a heat spot of predetermined area to said recording medium, the temperature of that portion of said recording medium where said heat spot is applied being equal to or greater than said Curie point;

(b) moving said heat spot along the surface of said recording medium; and (c) applying a magnetic field while said heat spot is moving from a first location to a second location, a first heat spot area at said first location and a second heat spot area at said second location having an overlapping portion, whereby information is recorded on said recording medium by orientating the direction of magnetization of that portion of said first heat spot area excepting said overlapping portion in accordance with the direction of said magnetic field applied.

8. The method as defined in claim 7 wherein said orientated direction of magnetization becomes fixed as that portion of said first heat spot area cools down.

9. The method as defined in claim 8 wherein said cooling is carried out by natural cooling.

10. The method as defined in claim 7 wherein said recording medium is locally magnetized for recording information in one direction vertical to the recording surface of said recording medium or its opposite direction.

11. An apparatus for recording information in a bit form on a magnetic recording medium by locally specifying the direction of magnetization in said medium while cooling down after having been heated to or above its Curie point, comprising:
    means for applying a heat spot on the recording surface of said recording medium;
    means for causing to move said heat spot along the recording surface of said recording medium; and
    means for applying a magnetic field to said recording medium at least partly, said magnetic field application means applying a magnetic field to record information on said recording medium in the form of a partial section of said heat spot as a bit of information where the direction of magnetization is orientated in a specified direction by said applied magnetic field.

* * * * *